United States Patent

[11] 3,583,277

| [72] | Inventor | Sydney R. Crockett<br>Oxnard, Calif. |
|------|----------|------------------------------------|
| [21] | Appl. No. | 779,409 |
| [22] | Filed | Nov. 27, 1968 |
| [45] | Patented | June 8, 1971 |
| [73] | Assignee | The United States of America as represented by the Secretary of the Navy |

[54] CLOSED BREECH LAUNCH TUBE AND VALVE MEANS THEREFORE
4 Claims, 9 Drawing Figs.

| [52] | U.S. Cl. | 89/1.8, 89/1.818 |
|------|----------|------------------|
| [51] | Int. Cl. | F41f 3/04 |
| [50] | Field of Search | 89/1.8, 1.81, 1.816, 1.818; 114/20 |

[56] References Cited
UNITED STATES PATENTS

| 2,777,455 | 1/1957 | Daudelin | 114/20X |
| 3,084,600 | 4/1963 | Walker | 89/1.818 |
| 3,182,554 | 5/1965 | Barakauskas | 89/1.81 |
| 3,263,564 | 8/1966 | Donovan | 89/1.8 |

*Primary Examiner*—Samuel W. Engle
*Attorneys*—Edgar J. Brower and Q. Baxter Warner ABSTRACT: A closed breech launch tube for elongate rocket powered missiles including a source of high-pressure air or gas and a rocket blast actuated valve to suddenly release a large quantity of such air or gas into the space behind the missile to assist its expulsion from the launch tube.

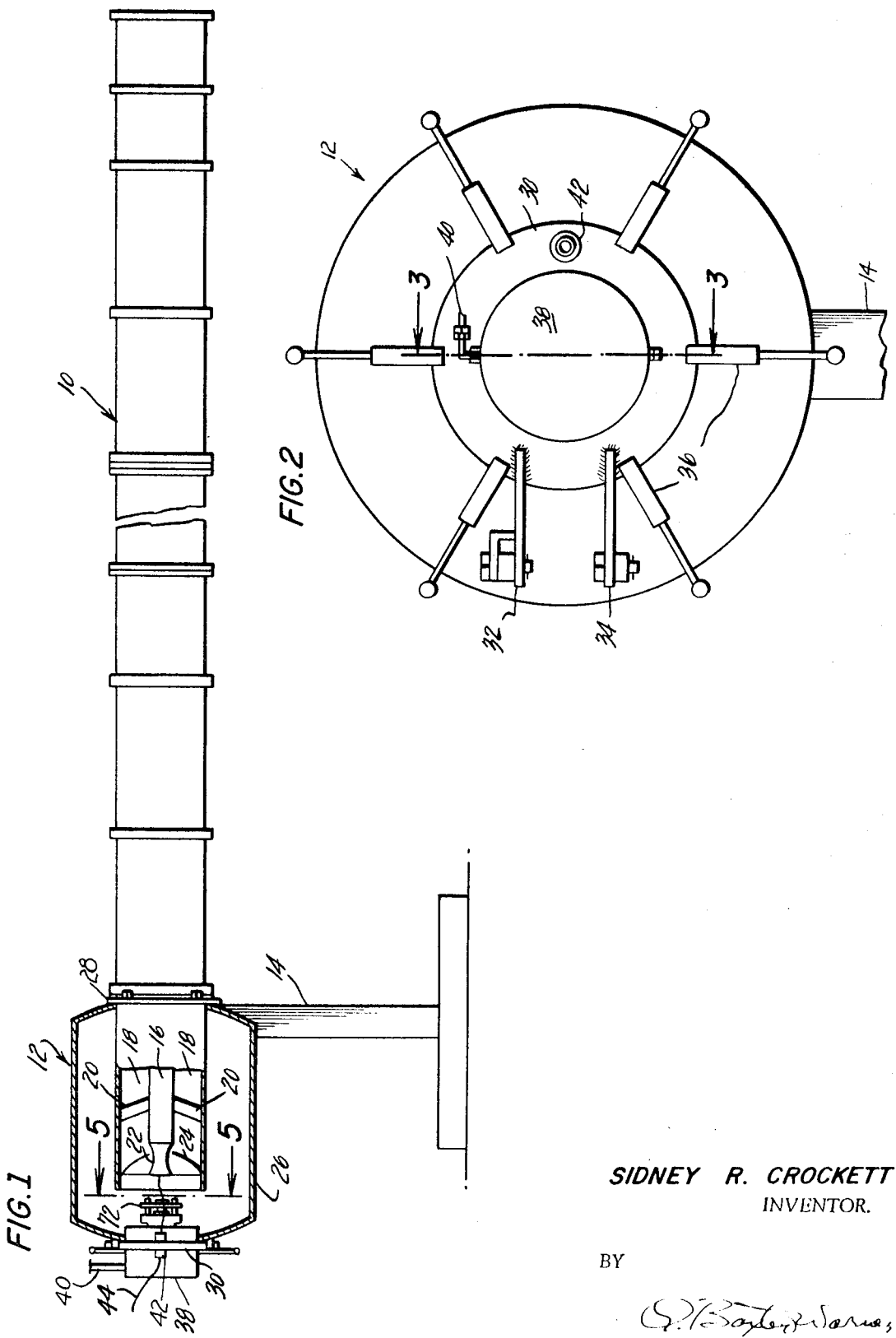
SIDNEY R. CROCKETT
INVENTOR.

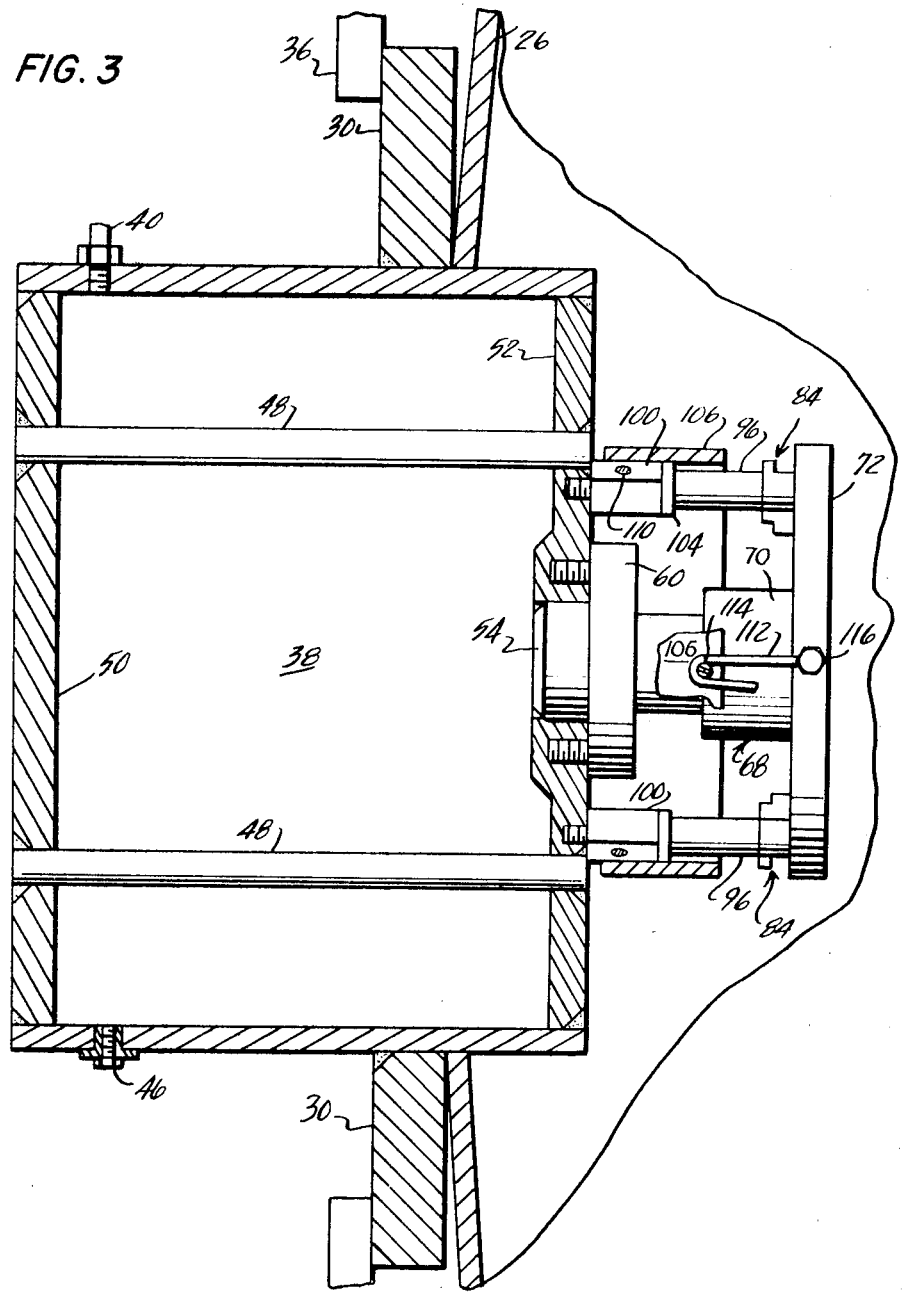

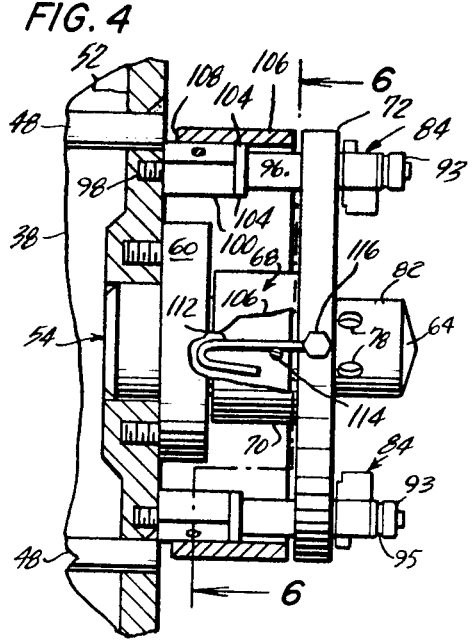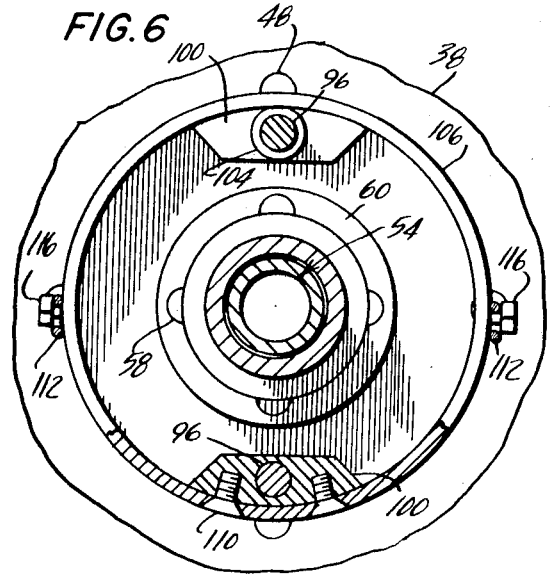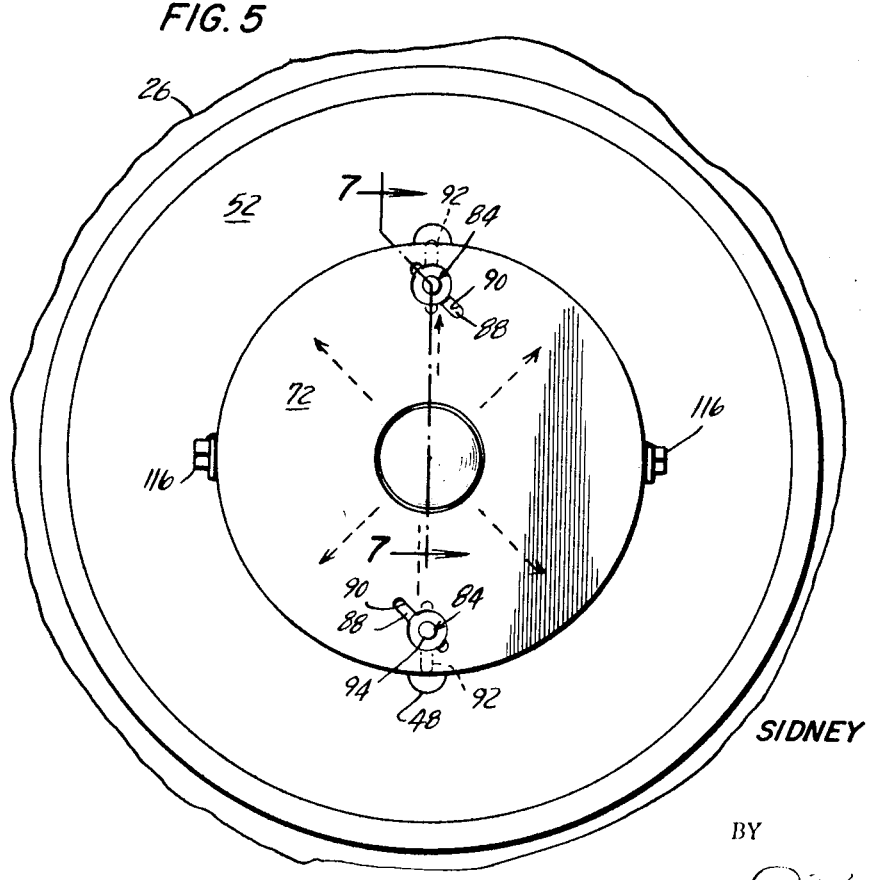

SIDNEY R. CROCKETT
INVENTOR.

CLOSED BREECH LAUNCH TUBE AND VALVE MEANS THEREFORE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention is in the field of rocket or missile launchers and particularly closed breech launchers wherein the breech pressure created by the rocket blast is augmented by an additional pressure source in order to provide increased rocket exit velocity.

2. Description of the Prior Art

Heretofore breech pressures in closed breech rocket launchers have been augmented by the ignition simultaneously with the rocket of a suitable propellant cartridge, such for example as are commonly used in aircraft pilot seat ejection devices. This practice is objectional because it necessitates the storage and handling of an explosive substance, the resultant breech pressures are erratic and unpredictable and the rocket exit velocities obtainable are limited.

SUMMARY OF THE INVENTION

A launch tube having a closed breech and containing a rocket or missile is provided with a high-pressure air or gas supply and a quick opening valve through which a large quantity of such air or gas may be admitted into the breech space behind the missile. The valve is opened by rocket blast acting upon a platelike valve actuating surface and the high-pressure air or gas greatly augments breech pressure so that the rocket emerges at an increased muzzle velocity. A control latch keeps the valve parts from rebounding to the closed position.

BRIEF DESCRIPTION OF THE DRAWINGS

FIG. 1 is a side elevation partially in section of a closed breech launcher incorporating the present invention.

FIG. 2 is an enlarged elevational end view of a portion of the launcher of FIG. 1.

FIG. 3 is a greatly enlarged sectional view taken along a line substantially corresponding to line 3-3 of FIG. 2 with the valve parts in the closed position.

FIG. 4 is a fragmentary change position side elevational view partially in section of the device of FIG. 3 with the valve parts in the open position and the valve plate lock bushings in the unlocked position.

FIG. 5 is an enlarged transverse elevational view taken along a line substantially corresponding to line 5-5 of FIG. 1 and illustrating the valve plate latch devices in their valve-open locking position.

FIG. 6 is a transverse sectional view with a portion broken away taken along a line substantially corresponding to line 6-6 of FIG. 4.

DESCRIPTION OF THE PREFERRED EMBODIMENT

Figure 7:
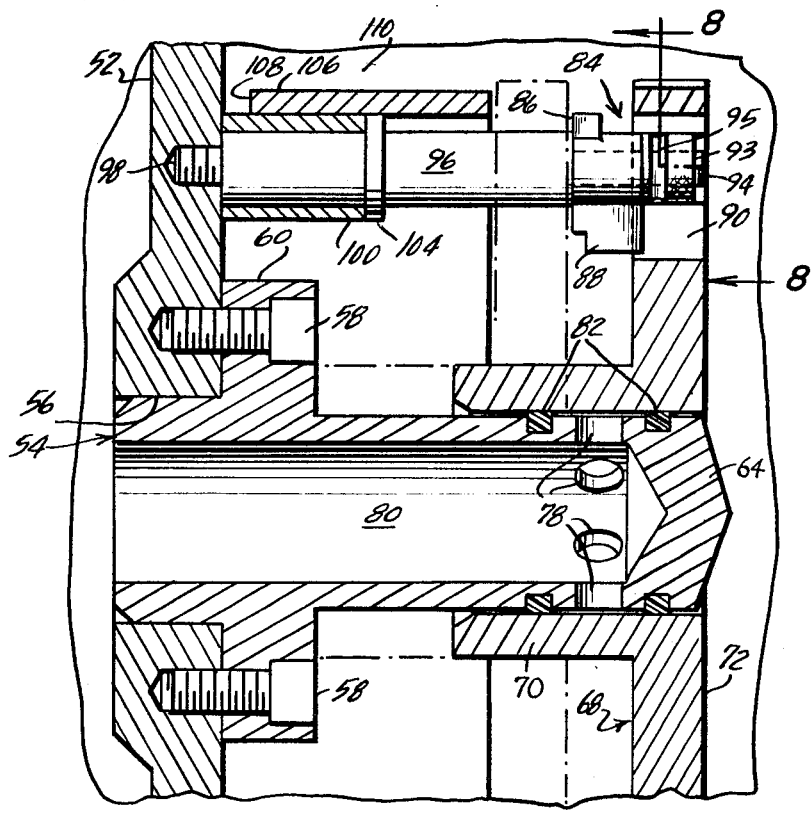
FIG. 7 is an enlarged longitudinal sectional view taken along a line substantially corresponding to line 7-7 of FIG. 5 and showing the parts in the valve-closed position.

Referring to the drawings in detail FIG. 1 shows a rocket or missile launcher assembly including a forwardly directed elongate launch tube 10 and a rearwardly located breech 12. The complete launcher may be mounted upon an upright stanchion 14 which by any well-known adjustable arrangement may permit movement of the launcher assembly in train and elevation.

In the embodiment illustrated the launch tube 10 is about 13 inches in internal diameter and can house a missile or rocket 16 which may be inserted from the rear through a suitable breech opening to be described in detail hereafter. Since the elongate rocket body is ordinarily substantially smaller in diameter than the launch tube such body is preferably retained in axial alignment within the tube by saddles or spacing blocks 18 which may be formed of a lightweight material such as Styrofoam. This arrangement not only supports the rocket centrally within the launch tube but serves also to protect the radially directed rocket vanes 20 which serve to impart directional stability to the rocket after launch.

The rear end of the rocket 16 may be provided with a conventional propulsion nozzle 22, which in FIG. 1 is shown extending through a nozzle receiving central opening in an obturator disc 24. This disc may be formed of aluminum or similar material and substantially closes the peripheral space between the nozzle 22 and the inner wall of the launch tube 10. In the embodiment illustrated, the disc provides about 100 sq. in. of surface against which the expanding gases in the breech assembly exert force to assist in moving the rocket forwardly at launch. The obturator disc as well as the Styrofoam spacing blocks are discarded once the rocket leaves the open forward end of the launch tube.

As best illustrated in FIGS. 1 and 2 the breech portion 12 of the launch tube includes an enlarged chamber or breech tank 26 which is joined to the after portion of the launch tube 10 at point 28. Breech tank 26 has a central opening or doorway aligned with the longitudinal axis of the launch tube and sufficiently large to permit insertion of the missile, Styrofoam saddles, and obturator disc into the rear end of launch tube 10 when loading the launcher. After such loading this doorway or hatch is closed by a breech door 30 supported on upper and lower hinges 32, 34 and locked in place by latch dogs 36, a number of which are located around the periphery of the door so as to insure a strong gastight seal when the door is dogged into place.

Door 30 mounts a centrally located high-pressure air or gas tank 38 which communicates through a suitable valve mechanism with the interior of the breech tank 26 to suddenly release high-pressure air or gas contained therein into the breech tank interior and thereby accelerate expulsion of a rocket from the launch tube upon rocket ignition. A high-pressure tank of about 550 cubic inches capacity has been found adequate in the embodiment illustrated.

The high-pressure tank 38 is provided with an inlet 40 which may include a flexible supply line or a quick coupling assembly so that said tank may readily be charged wit high-pressure air or gas in preparation for each rocket launch. Likewise the door 30 is provided with a sealed electrical lead-in insulator and connector 42 (FIGS. 1 and 2) through which electrical connection may be made as by an ignition wire 44 so that the rocket may be ignited after the high-pressure chamber door 30 is closed and dogged into place. A drain plug 46 (FIG. 3) or a valve enables the high-pressure tank contents to be dumped and permits condensation to be drained when desired. Such means may be particularly useful where a missile misfire occurs and it is desired to rid the chamber of its high-pressure contents before opening the door 30. Suitable reinforcing rods 48 may interconnect outer and inner walls 50, 52 of the high-pressure tank in order to improve its structural strength.

The inner wall 52 of the high-pressure tank 38 may be provided with a quick opening large volume flow valve through which the high-pressure air or gas from within tank 38 may instantly be admitted into the breech tank 26 within a fraction of a second after the rocket is fired. As shown in detail in FIG. 7 the valve comprises a central stem 54 which is suitably secured in an axial opening 56 in the wall 52 and is retained by means of screws or studs 58 which extend through an external flange 60 forming a part of the stem 54. The opposite end of the valve stem is closed by a solid end portion 64.

Sleeve valve 68 includes a stem encompassing tubular central portion 70 and an enlarged end plate or disc 72 against which the rocket blast is directed upon rocket firing in order to shift the sleeve to the left in a manner to be discussed hereinafter. In the closed position shown in FIG. 7 the tubular portion 70 covers the radially directed openings 78 which lead from the passage 80 within the stem 54 into the space within the breech tank 26. Leakage between the stem 54 and the tubular central portion 70 of the movable sleeve valve 68 is prevented by suitable sealing devices such as gaskets or "O" rings 82.

As shown in FIG. 1 the valve plate 72 is located immediately to the rear of the propulsion nozzle 22 of the rocket and hence receives the full force of the rocket blast upon rocket ignition. The blast pressure immediately shifts the valve plate 72 to the change position illustrated in FIG. 4 uncovering all of the radially directed ports 78 and allowing high-pressure air from tank 38 to be dumped in high volume into the interior of the breech tank 26. The relative positions of the parts with the valve open are shown in FIG. 4 where the ports 78 are uncovered and high-pressure gas exhausting therefrom sweeps over the outer face of the valve plate 72 to impinge upon and actuate suitable latch means to keep the sleeve valve from rebounding into a closed position.

Figure 8:
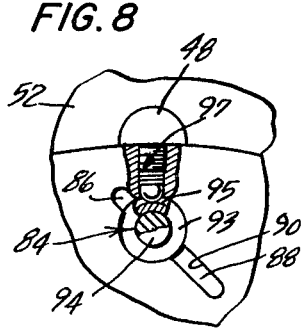
FIG. 8 and 9 are detailed views showing the close interfitting relationship between the plate lock bushing and the contoured opening through the valve plate.
Figure 9:
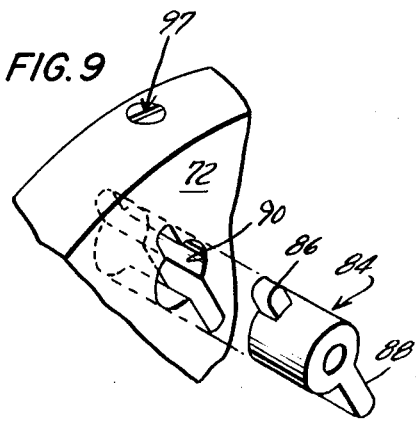

The latch means employed comprises rotatable lock bushings 84 shown in detail in FIGS. 8 and 9. Each bushing includes a short toe 86 and a larger oppositely located vane portion 88. In the valve closed position the lock bushings lie partially within specially contoured openings 90 extending through opposite sides of the large valve plate 72 so that the sleeve valve assembly may freely move from the valve-closed to valve-open position. However in valve-open position the high-pressure blast of air or gas from the radially directed openings 78 in the valve stem 54 impinges upon the large vane portions 88 to rotate bushings 84 to bring the vane and toe portions into new positions out of alignment with the contoured openings 90 and into a position substantially corresponding to the dotted line positions 92 shown in FIG. 5. Lock bushings 84 are each retained by a circular nut 93 threaded upon the outer end 94 of an upright post 96 the opposite end 98 of which is shown threaded into inside wall 52 of the high-pressure chamber. Adjacent this wall each post extends through a skirt support fitting 100. As shown fittings 100 are each retained in place between the inner wall 52 of the high-pressure chamber and a ledge 104 located near the intermediate portion of each post 96.

To aid in keeping the sleeve valve assembly in the valve-closed position even during elevation of the launch tube the circular nuts 93 are each provided with a peripheral groove 95. Each groove may be engaged by a ball and spring type detent 97 (FIG. 8) and the resistance to movement thus provided prevents undesired movement of the sleeve valve assembly 68.

In order to prevent rocket blast gases or other turbulence from acting on the undersurface of the valve plate 72 after it has moved to the valve-open position a circular skirt 106 may be mounted as shown in FIGS. 6 and 7. This skirt may have vent slots 108 located as shown and may be secured to the skirt support fittings 100 by screws 110. The skirt may also mount two oppositely arranged wire loops 112 which normally limit outward movement of the sleeve valve assembly 68 by engagement with an anchor pin 114, but are hingedly supported upon capscrews 116 so that they may be moved out of alignment with said anchor pins whereupon the entire sleeve valve assembly may then be completely removed off of the end 64 of stem 54.

In operation, breech door 30 is opened wide and rocket or missile 16 is loaded into the rear of the launch tube. As shown it may be axially centered in the launch tube 10 through the use of Styrofoam saddles 18. Thereafter the obturator disc 24 is put into place with its central aperture receiving the rearwardly directed rocket nozzle 22. At this time the sleeve valve assembly 68 is shifted to the right so that valve ports 78 are covered by the tubular portion 70. To accomplish this the valve plate lock bushings 84 are each first aligned with their respective irregular openings 90 (FIG. 9) so that the plate can be moved to the valve-closed position shown in FIG. 7 during which movement the bushings 84 pass almost entirely through openings 90. Thereafter ignition wire 44 may be connected to electrical fitting 42 or, alternatively, it may extend through such fitting and be sealed to prevent escape of gas at that point. Thereafter breech door 30 is closed and latch dogs 36 are dogged into position to seal the door opening. At an appropriate time high-pressure air may be admitted into the pressure tank 38 until the desired high pressure is attained, 800 lbs. having been found to be a satisfactory pressure in the embodiment illustrated.

Upon rocket ignition the rocket blast impinges upon the face of valve plate 72 and overcomes the resistance of the spring biased ball detents 74 to shift the entire sleeve valve assembly 68 to the left to the change position illustrated in FIG. 4. This uncovers the radially directed ports 78. The blast of high-pressure air entering the breech tank next impinges upon the vane portions 88 of the lock bushings 84 to rotate them to the change position 92 (FIGS. 5 and 8) out of alignment with the irregular openings 90 thus effectively keeping the sleeve valve from bouncing back to a valve-closed position. The combined pressures of the rocket blast and incoming high-pressure air, acting upon the large area obturator disc 24 expels the missile at high velocity from the forward open end of the launch tube. Upon egress the Styrofoam saddles and obturator disc are discarded.

Obviously many modifications and variations of the present invention are possible in the light of the above teachings. It is therefore to be understood that within the scope of the appended claims the invention may be practiced otherwise than as specifically described.

What I claim is:

1. In a closed breech launcher for rockets and the like, the improvement which comprises:
   means for admitting fluid under pressure into the breech behind the rocket to augment the breech pressure created by the rocket exhaust upon launching and thereby result in an increased muzzle velocity, said means including
   a normally closed valve located in the path of the exhaust blast from the rocket upon launching, said valve acting when opened to admit pressurized fluid to the breech behind the rocket,
   said valve being opened by the impingement thereon of exhaust blast from said rocket,
   said normally closed valve comprising a hollow stem lying parallel to the longitudinal axis of the rocket launcher, said stem having at least one radially extending port therein through which said pressurized fluid may pass,
   a collar mounted on said stem and slidable therealong, said collar covering said port where said valve is in its normally closed condition, and
   a plate forming a flanged extension of said collar and disposed to receive the exhaust blast from said rocket upon launching,
   whereby the reception of such exhaust blast from said rocket by said plate will cause said collar to slide along said stem and uncover said port to allow said pressurized fluid to pass therethrough.

2. A closed breech launcher according to claim 1, further comprising
   latch means actuatable to lock said collar in part-open position after it has assumed such position following its movement along said stem in response to the reception of rocket exhaust blast by said plate.

3. The combination of claim 2 in which said latch means is actuated to lock said collar by the pressure on said latch means of fluid passing through said port after the latter has been opened by movement of said collar.

4. In combination, a closed breech launcher for rockets and a valve for rapid admission of high-pressure fluid into the launcher breech to increase rocket velocity, said valve comprising:
- a fluid flow member having at least one opening leading into the interior of said breech;
- a source of high-pressure fluid to said member;
- a closure normally obstructing said opening to prevent the egress of high-pressure fluid therefrom into said breech;
- said closure being movable from a position closing said opening to a position exposing said opening; and
- blast responsive means connected to said closure for movement of same from the closed to the open position said blast responsive means being located in the path of the blast of the rocket being launched, whereby blast action moves the closure to uncover said opening and admit high-pressure fluid into the breech to increase rocket exit velocity.